Nov. 14, 1967   R. J. MacDONALD ET AL   3,352,647
BEARING MATERIAL

Filed Aug. 22, 1966   3 Sheets-Sheet 2

INVENTORS
ROBERT J. MacDONALD
JAMES F. WARD

ATTORNEY

United States Patent Office 3,352,647
Patented Nov. 14, 1967

3,352,647
BEARING MATERIAL
Robert J. MacDonald, Moreland Hills, and James F. Ward, Cleveland Heights, Ohio, assignors to Clevite Corporation, a corporation of Ohio
Filed Aug. 22, 1966, Ser. No. 579,470
15 Claims. (Cl. 29—182.1)

ABSTRACT OF THE DISCLOSURE

A composite bearing material composed of a substrate of copper and additives such as lead and/or tin. The substrate may be in the form of a cast, sintered or porous structure. The substrate is over-cast, infiltrated or impregnated with a phase of corrosion resistant material in molten form which includes lead, tin and a tin diffusion resistant material such as zinc, cadmium or nickel, for a sufficient period of time, to provide a tin resistant barrier layer between the lead-tin phase and the copper base substrate. The barrier establishes an inter-metallic formation with the copper base substrate.

---

The present invention relates to a material employed for making automotive bearings and to a method for producing such a bearing material. More particularly the invention relates to a copper-lead-tin bearing material having a diffusion barrier between the copper and tin-lead phases.

This application is a continuation-in-part of application Serial No. 434,378, filed February 23, 1965, assigned to the same assignee and now abandoned.

The trend in the automotive industry is presently towards more powerful engines, longer warranty periods and increased intervals between suggested oil changes. These requirements demand that the bearings in the engine be stronger, more corrosion resistant and have improved surface rubbing characteristics.

It is well known that the engine oil, degraded by high temperature, corrosively attacks the surface of an unprotected copper-lead bearing. It has therefore been customary to alloy the lead base with tin or a tin alloy to make it a corrosion resistant metal. However, tin has a definite affinity for copper and will migrate towards and diffuse into the copper matrix at operating temperatures of an automative engine. As a result an intermediate brittle layer of copper-tin is gradually formed between the lead-tin alloy and the copper matrix and the tin is allowed to escape the lead environment thereby making the lead more vulnerable to corrosive elements. The brittle layer establishes a greater surface sensitivity to misalignment, dirt, debris and ultimately destroys the usefulness of the bearing. Attempts have heretofore been made to inhibit the migration of tin at engine temperatures. A representative disclosure of the prior art is contained in U.S. Patent No. 2,459,172 assigned to the same assignee as the present invention. Essentially, in the prior art, a multi-layer bearing is known which consists of a continuous barrier layer bonded to and by electrodeposition disposed between the copper layer and overlay of lead-tin. In certain respects this improves the bearing and controls the amount of tin that will diffuse from the overlay through the barrier to the copper layer. The worklife of such a device is, however, relatively short; for instance, piercing of the unalloyed barrier at any one area will permit the tin to diffuse through such area and react with the copper layer thereby depreciating the operating qualities of the bearing as a whole.

The present invention is based upon the concept of depositing upon a copper-base bearing surface a metal phase comprised of molten lead and tin and a metal resistant to tin diffusion, the latter metal having a limited solubility for tin and being capable of metallurgically reacting with the surface of the copper-base to form a solid solution and an intermetallic formation with the bearing surface at a rate faster than tin to provide a barrier layer resistant to tin diffusion between the copper base and the lead-tin phase.

In one embodiment of the invention, a porous copper base powder metal matrix is infiltrated with a lead-tin alloy containing an element which has a low solubility in tin and an affinity for the matrix material greater than tin. During heat treatment and subsequent solidification of the lead-tin phase in the matrix, the said element is precipitated and migrates toward the matrix material where it combines and forms an alloy therewith. This facilitates a distribution of a corrosion resistant material throughout the matrix body and establishes a barrier between the corrosion resistant element, e.g., tin, and the matrix material to prevent diffusion and build-up of a brittle interlayer therebetween. The barrier layer is preferably composed of cadmium, zinc, nickel or alloys thereof.

In another embodiment of this invention, a layer of lead-tin and a metal resistant to tin diffusion and having a greater affinity for copper than said tin is bonded to a cast copper base matrix for establishing a tin diffusion barrier between the matrix and the layer. The barrier forms an intermetallic reaction between the lead-tin phase and the matrix.

In a still further embodiment of this invention, the basic concept of this invention is utilized to provide a barrier layer by means of overcasting onto a sintered copper-lead matrix a layer of lead-tin and a metal resistant to tin diffusion and having a greater affinity for copper than said tin. The metal resistant to tin diffusion, e.g., zinc, penetrates together with the tin into the surface-connected areas of lead for causing an alloying of the lead with tin for a certain distance, which depends upon the degree of surface continuity of the lead pockets, effecting an internal reaction at the lead pockets. The copper interface results in a copper-zinc intermetallic film which is resistant to tin diffusion and restricts the tin to the lead pockets.

It is therefore the primary object of this invention to provide a bearing material having improved corrosion resistance characteristics.

It is a further object of this invention to provide a bearing material, and a method for producing same, in which the bearing surface layer, and more particularly the corrosion-resistant tin thereof is prevented from migrating towards and penetrating into the copper base matrix.

It is a further object of this invention to provide a bearing material in which a barrier layer resistant to tin diffusion is established between the matrix and the bearing surface by means of an intermetallic reaction to increase the durability of the barrier and the matrix material.

It is a still further object of this invention to provide a bearing material having a tin diffusion barrier, in which the barrier is established by the migration of the barrier metal material toward the matrix at a rate faster than any other material of the bearing surface layer.

For a better understanding of the present invention, together with other and further objects thereof, reference is had to the following description taken in connection with the accompanying drawings, and its scope will be pointed out in the appended claims.

Figure 1:
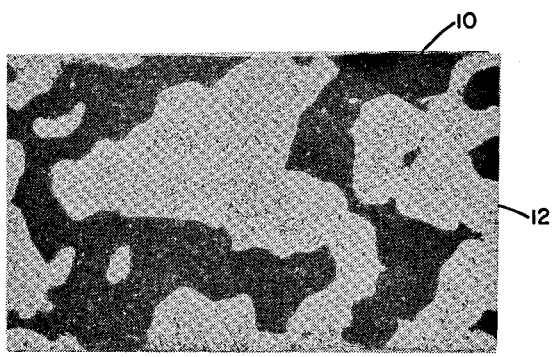
FIGURES 1 and 2 are photomicrographs of bearing material in accordance with the prior art, shown at a magnification of 250 times.

Referring now to the drawings, there is shown in FIGURE 1 a typical grid structure with lead pockets in a copper matrix. More particularly, the structure is composed of a copper matrix 12 infiltrated with 99.5% lead 10 and 0.5% tin (not visible). Inasmuch as lead does not react with copper at the temperatures herein under consideration, only minor compounds are present at the interface between the two materials.

Figure 2:

FIGURE 2 demonstrates the effect of adding a small percentage of tin to the lead infiltrant described with respect to FIGURE 1. The matrix material is composed of copper 16 and infiltrated with 90 weight percent lead 14 and 10 weight percent tin 18. The tin which has been added for corrosion resistance has diffused into the matrix and formed an interlayer therewith, see 18, of Cu-Sn compounds at the interface between the lead and copper. The photomicrograph shown in FIGURE 2 illustrates that tin has a natural affinity for copper at elevated temperatures.

The advantages of the invention are achieved by establishing a protective barrier layer between the copper lead base and the corrosion resistant layer which forms a strong intermetallic reaction between the base and the surface layer. By virtue of such intermetallic formation, a bond is established which exceeds in strength and in depth comparative, conventional, electrodeposited barriers. As noted above, the purpose of this layer is to restrict the diffusion of tin from the lead base infiltrant into the copper.

In order to establish an effective barrier layer, certain criteria must be met. Thus, the barrier layer must have a very limited solubility for solid tin, so that during actual bearing performance at temperatures up to 350° F. there will be no, or only negligible, diffusion of tin through the barrier layer. The metal selected to establish the barrier layer must have liquid solubility in lead at least amounting to about 2 weight percent at approximately 1100° F. Lower levels of solubilities and higher temperatures could be tolerated, but these make the process not practical in the present state of the art. Furthermore, during infiltration of a porous copper or bronze grid structure, or overcasting the copper base matrix, the additive metal must be capable of reacting with copper to form a solid solution or an intermetallic compound therewith at a faster rate than would tin. The latter qualification facilitates restricting the tin within the lead phase both during infiltration or casting, as well as during working of the material at elevated temperatures.

Figure 3:
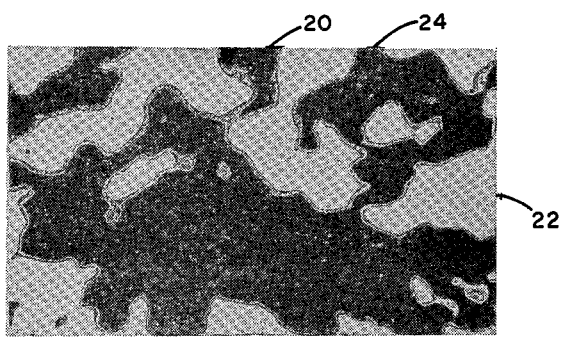
FIGURE 3 is a photomicrograph of a bearing material in accordance with the preferred embodiment of this invention shown at a magnification of 250 times.
Figure 4:
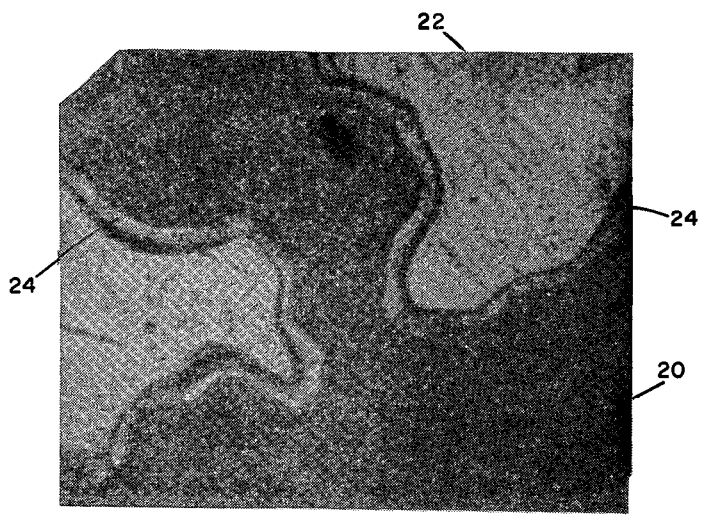
FIGURE 4 is a photomicrograph of the bearing material shown in FIGURE 3 shown at 1000 times magnification.

FIGURES 3 and 4 show a bearing material in accordance with one embodiment of this invention. The structure is composed of a sintered, copper base, powder metal matrix 22 which has been infiltrated with materials providing good rubbing contact qualities and corrosion resistance characteristics such as lead and tin. The infiltrant material 20 includes an aditive material which is effective for forming a barrier layer 24 between the corosion resistant material and the metal matrix. The materials having the required characteristics are zinc, cadmium and nickel.

FIGURE 3 shows a copper base matrix 22 infiltrated with 92.5 weight percent lead, 5 weight percent tin and 2.5 weight percent zinc. The above mentioned barrier layer elements, and to a very limited extent arsenic, have little or no solid solubility in lead. During infiltration of the infiltrant materials into the matrix and upon subsequent cooling thereof these materials when contained in the lead-tin alloy will separate out as pure elements, see 24. The invention utilizes this behavior together with the natural affinity of the elements for copper to cause the compound of copper and either zinc, cadmium or nickel, or alloys thereof, to be formed on the internal surfaces of the porous copper matrix. The presence of such an alloy acts as a barrier to retard tin diffusion during both infiltration and exposure to the operating temperatures found in automotive engines.

The following table shows the range and the preferred compositions for the various infiltrants falling within the scope of this invention. The porous substrate prior to infiltration comprises essentially 80–90% copper and 10–20% of pre-alloyed bronze of 90% copper and 10% tin. The ratio of the aforementioned substrate material to the corrosion resistant infiltrant material is approximately 1 to 1. A variation of this ratio within 20% is commercially acceptable.

TABLE I.—COMPOSITION OF INFILTRANTS BY WEIGHT PERCENT

| Alloy | Lead | Tin | Zinc | Cadmium | Nickel |
|---|---|---|---|---|---|
| 1—Range | 85–95 | 5–12 | 1–4 | | |
| Preferred | 92.5 | 5 | 2.5 | | |
| 2—Range | 85–95 | 5–10 | | 1–5 | |
| Preferred | 90 | 7 | | 3 | |
| 3—Range | 87–95 | 5–10 | | | 1–3 |
| Preferred | 93.5 | 5 | | | 1.5 |

Figure 5:
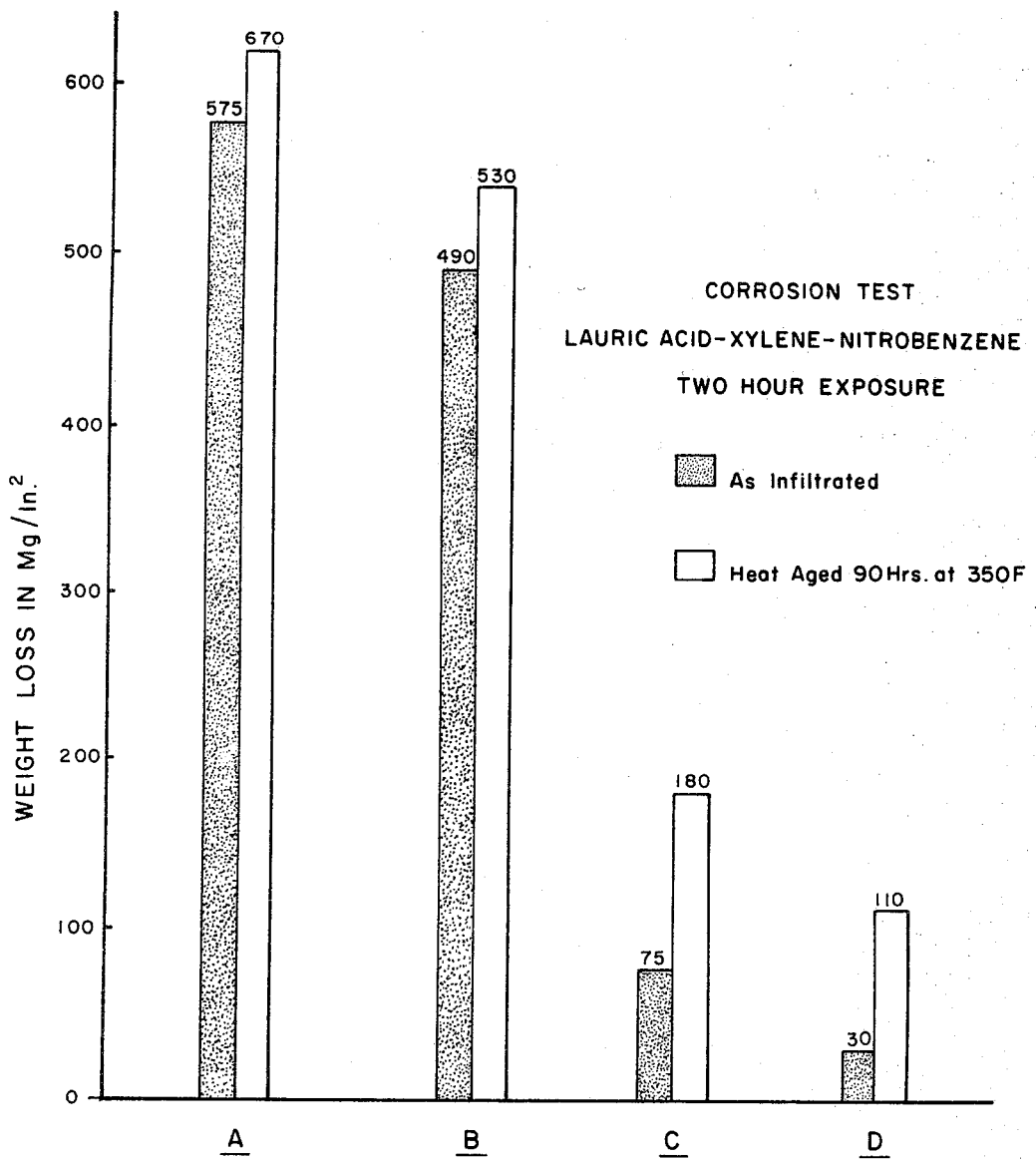
FIGURE 5 is a chart showing comparative corrosion test results.

The significance of the invention and the improvement obtained thereby is illustrated in FIGURE 5 which shows the results of corrosion tests on a number of bimetal copper-lead bearing materials.

The composition of the materials tested is shown in the following table.

TABLE II.—COMPOSITION BY WEIGHT

| Infiltrant Alloy | A | B | C | D |
|---|---|---|---|---|
| Lead | 99.5 | 90 | 92.5 | 90.0 |
| Tin | 0.5 | 10 | 5.0 | 7.0 |
| Zinc | | | 2.5 | |
| Cadmium | | | | 3.0 |

As noted in FIGURE 5, the corrosive media used for conducting the test was a boiling solution of xylene, lauric acid and nitrobenzene. A comparison of the performance indicates that adding only tin to the infiltrant, as in alloy B, see Table II and FIGURE 5, does not provide any substantial improvement over the alloy A which contains only a trace amount of tin.

The reason for this result is that the tin is not retained in the lead but has migrated into the bronze grid during the infiltration process thereby depleting the lead and making it prone to corrosion.

In alloys C and D additions of the barrier elements, zinc and cadmium respectively, has sharply reduced the corrosion of these materials even though they contain less tin than alloy B. This result is achieved because the tin which is in the infiltrant is being retained by the barrier. The data for heat aged conditions simulate the thermal effects of over 50,000 miles of engine use and indicates the effectiveness of the barrier elements.

The bearing material in accordance with this invention is produced as follows. A backing member in strip form, not shown, of cold rolled low carbon steel is cleaned in caustic and acid solutions. Thereafter a layer of powder is deposited upon the strip and passed through a furnace to achieve sintering and bonding of the powder to the strip. The sintering temperature is in the range of 1860 to 1890° F. and the atmosphere is exothermic. The composite strip then passes through a cooling zone which causes a decrease in strip temperature to the 700 to 1100° F. range. By this method a porosity of about 40–50 v./o. is obtained in the sintered powder layer.

Preferably, immediately adjoining the cooling zone an apparatus provides for the distribution of molten infiltrant alloy in a reducing atmosphere, see Table I. The range and preferred temperature at which the various infiltrants are caused to infiltrate the matrix in the molten state and the temperature at which the grid is maintained are set forth in Table III. The process temperatures are given for each alloy identified in Table I. The numerals in Table III correspond to those of Table I.

TABLE III.—PROCESSING TEMPERATURES IN DEGREES FAHRENHEIT

| Alloy | Infiltrant | Grid Temperature |
|---|---|---|
| 1—Range | 800–1,200 | 800–1,100 |
| Preferred | 900 | 950 |
| 2—Range | 700–900 | 800–1,100 |
| Preferred | 750 | 900 |
| 3—Range | 1,100–1,600 | 1,000–1,400 |
| Preferred | 1,400 | 1,200 |

The back side of the strip is cooled to solidify the infiltrant material and reduce the temperature of the strip. After water quenching the strip is coiled and formed into bearing shapes.

The essential characteristics of the invention, as above described, apply with equal facility to overcasting a cast or sintered copper base bearing material with a lead-tin phase alloy containing an additive element of zinc, cadmium or nickel.

In such bearings an essentially continuous interaction barrier layer of, for instance copper-zinc, is provided over the face of the matrix material. As in the above described embodiment, during casting of the surface layer of, e.g., lead-tin-zinc, the zinc migrates faster towards the copper matrix than the tin phase. Each of the additive materials has a liquid solubility in molten lead-tin. When cast onto the copper base material there is a greater affinity for such materials, i.e., zinc, cadmium and nickel, to react with copper than there is for tin. Therefore, a thin intermetallic reaction layer is formed immediately. This barrier layer is resistant to tin diffusion and thus precludes migration of the tin toward the copper matrix. Furthermore, the intermetallic reaction which establishes the barrier layer serves to upgrade the fatigue resistance of the trimetallic bearing.

The composition of the cast substrate is approximately 65 to 95% copper with the balance substantially all lead except for a minor amount of additives such as tin. The preferred composition is 75 weight percent copper, 24 weight percent lead and 1 weight percent tin.

The overcast is composed of materials as described in Table I. The thickness of the overlay after the bearing has been precision bored is in the range from 0.0005" to 0.002".

In the case of a sintered copper-lead substrate, the barrier material, as well as the tin phase, migrate into the surface connected areas of the lead pockets of the matrix causing an alloying of the lead with tin for a distance, depending upon the surface continuity of the lead pockets. The internal reaction at the lead pockets-copper interface results in a copper-barrier layer (e.g., copper-zinc) film which restricts the tin to the lead pockets.

The composition of the sintered substrate and overlay material is the same as above described with respect to the cast substrate.

While there have been described what are at present considered to be the preferred embodiments of this invention, it will be obvious to those skilled in the art that various charges and modifications may be made therein without departing from the invention, and it is aimed, therefore, in the appended claims to cover all such changes and modifications as fall within the true spirit and scope of the invention.

We claim:

1. A composite bearing material comprising: a copper base substrate; a phase of metals consisting of tin diffusion resistant materials selected from a group consisting essentially of zinc, cadmium, and nickel and of corrosion resistant materials having a lesser degree of affinity for the copper of said substrate than said tin resistant materials and comprising lead and tin; said tin diffusion resistant metal being segregated into a generally tin-free form providing a barrier layer between the lead-tin phase and said copper, said barrier layer establishing an intermetallic formation with said copper.

2. A composite bearing material according to claim 1, wherein said substrate is sintered providing surface connected areas of pockets containing lead at least partly infiltrated by a tin phase; and said barrier layer being located between the interface of the lead pockets and the copper substrate.

3. A composite bearing material according to claim 1, wherein said substrate is a cast structure and said tin diffusion resistant metal is overcast and bonded to said substrate.

4. A composite bearing material according to claim 1, wherein said substrate is a porous structure impregnated with said corrosion resistant and tin diffusion resistant materials.

5. A composite bearing material according to claim 1, wherein said cadmium constitutes 1 to 5 weight percent of the total weight of said phase of metals.

6. A composite bearing material according to claim 5, wherein said cadmium constitutes approximately 3 weight percent of the total weight of said phase of metals.

7. A composite material according to claim 1, wherein said zinc constitutes 1 to 4 weight percent of the total weight of said phase of metals.

8. A composite material according to claim 7, wherein said zinc constitutes approximately 2.5 weight percent of the total weight of said phase of metals.

9. A composite material according to claim 1, wherein said nickel constitutes 1 to 3 weight percent of the total weight of said phase of metals.

10. A composite material according to claim 9, wherein said nickel constitutes approximately 1.5 weight percent of the total weight of said phase of metals.

11. A composite bearing material according to claim 4, wherein the metal phase is composed of 85 to 95 weight percent lead and 5 to 12 weight percent tin and the balance of said barrier layer material.

12. A composite bearing material according to claim 11, wherein said metal phase is composed, by weight percent, of approximately 92.5% lead, 5% tin and 2.5% zinc.

13. A composite bearing material according to claim 11, wherein said metal phase is composed, by weight percent, of approximately 90% lead, 7% tin and 3% cadmium.

14. A composite bearing material according to claim 11, wherein said metal phase is composed, by weight percent, of approximately 93.5% lead, 5% tin and 1.5% nickel.

15. A composite bearing material according to claim 2, wherein said corrosion resistant materials consist essentially of 85 to 95 weight percent lead and 5 to 12 weight percent tin and said barrier layer material consists essentially of, in weight percent, 0 to 4% zinc, 0 to 5% cadmium and 0 to 3% nickel.

(References on following page)

References Cited

UNITED STATES PATENTS

| | | | |
|---|---|---|---|
| 2,075,444 | 3/1937 | Koehring | 29—182 X |
| 2,198,240 | 4/1940 | Boegehold | 29—182.1 X |
| 2,198,253 | 4/1940 | Koehring | 29—182.1 |
| 2,198,254 | 4/1940 | Koehring | 29—182.1 |
| 2,280,103 | 4/1942 | Swartz | 75—156.5 |
| 2,336,615 | 12/1943 | Tennison | 29—199 X |
| 2,459,172 | 1/1949 | Luetkemeyer | 29—199 X |
| 2,802,733 | 8/1957 | Bungardt | 75—156.5 |
| 2,902,748 | 9/1959 | Schaefer | 75—208 X |
| 2,986,464 | 5/1961 | Lewis | 75—208 |
| 2,996,377 | 8/1961 | Vaders | 75—156.5 X |

BENJAMIN R. PADGETT, *Primary Examiner.*

A. J. STEINER, *Assistant Examiner.*